United States Patent
Sanghvi

(12) 
(10) Patent No.: US 9,734,529 B1
(45) Date of Patent: *Aug. 15, 2017

(54) METHOD, SYSTEM, AND COMPUTER READABLE MEDIUM FOR SELECTION OF CATALOG ITEMS FOR INCLUSION ON A NETWORK PAGE

(71) Applicant: Amazon Technologies, Inc., Seattle, WA (US)

(72) Inventor: Viraj Vijay Sanghvi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,381

(22) Filed: Aug. 10, 2016

Related U.S. Application Data

(63) Continuation of application No. 13/936,542, filed on Jul. 8, 2013, now Pat. No. 9,443,265, and a continuation of application No. 13/076,482, filed on Mar. 31, 2011, now Pat. No. 8,484,097.

(51) Int. Cl.
| | | |
|---|---|---|
| *G06Q 30/00* | (2012.01) | |
| *G06F 17/30* | (2006.01) | |
| *G06Q 30/06* | (2012.01) | |

(52) U.S. Cl.
CPC ..... *G06Q 30/0623* (2013.01); *G06F 17/3089* (2013.01); *G06F 17/30861* (2013.01); *G06F 17/30899* (2013.01); *G06Q 30/0603* (2013.01); *G06Q 30/0641* (2013.01)

(58) Field of Classification Search
CPC . G06Q 30/0601–30/0643; G06Q 30/08; G06F 17/30; G06F 17/3089; G06F 17/30899; G06F 17/30861; G06F 17/30424; G06F 17/30442; G06F 17/30554
See application file for complete search history.

(56) References Cited

U.S. PATENT DOCUMENTS

| | | | | |
|---|---|---|---|---|
| 2004/0165007 A1* | 8/2004 | Shafron | ............... | G06F 9/4443 715/781 |
| 2004/0267613 A1* | 12/2004 | Chan | ..................... | G06Q 30/02 705/14.67 |
| 2006/0224951 A1* | 10/2006 | Burke | ............... | G06F 17/30899 715/234 |
| 2007/0219982 A1* | 9/2007 | Piper | ................... | G06F 17/3043 |
| 2009/0094050 A1* | 4/2009 | Yoshida | ............... | G06Q 30/012 705/346 |
| 2011/0202424 A1* | 8/2011 | Chun | ................... | G06F 3/0481 705/26.8 |

\* cited by examiner

*Primary Examiner* — William Allen
(74) *Attorney, Agent, or Firm* — Thomas | Horstemeyer, LLP

(57) ABSTRACT

Disclosed are various embodiments for generating client-side code for selecting catalog items for display on a network page. The catalog items have corresponding catalog item identifiers and catalog item representations. In response to a network request, item selection code and catalog item identifiers are transmitted to a client device. The client device executes the item selection code to select a subset of the catalog item identifiers. At least one of the catalog items is selected for inclusion on a network page. The network page is displayed to a user.

20 Claims, 3 Drawing Sheets

METHOD, SYSTEM, AND COMPUTER READABLE MEDIUM FOR SELECTION OF CATALOG ITEMS FOR INCLUSION ON A NETWORK PAGE

CROSS REFERENCE TO RELATED APPLICATIONS

This application is a continuation of and claims the benefit of co-pending U.S. patent application Ser. No. 13/936,542, filed Jul. 8, 2013, entitled "METHOD, SYSTEM, AND COMPUTER READABLE MEDIUM FOR SELECTION OF CATALOG ITEMS FOR INCLUSION ON A NETWORK PAGE," as well as U.S. patent application Ser. No. 13/076,482, filed Mar. 31, 2011, now U.S. Pat. No. 8,484,097, entitled "METHOD, SYSTEM, AND COMPUTER READABLE MEDIUM FOR SELECTION OF CATALOG ITEMS FOR INCLUSION ON A NETWORK PAGE," both of which are incorporated herein by reference in their entireties.

BACKGROUND

Online shoppers interact with product search engines to find products of interest and obtain information about those products. The product search engine returns summary information for products that most closely match a user's search query. The user then selects a link associated with one of the search results to get more information about a product. Some electronic commerce sites also include a product catalog, or taxonomy. In addition to using the product search engine, a user can navigate through this hierarchical catalog to obtain information about products.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to selecting catalog items for display on a network page. The selection is performed by code executing in conjunction with a browser executing on a client device rather than being performed by a server. A user interacts with a browser to request a network page, such as a catalog item detail page. A network page server responds to the request by providing information about a set of catalog items matching the request. In the case of a network detail page, the catalog items include the requested item as well as related items.

The response to the network page request provided by the network page server includes a set of object identifiers corresponding to catalog items. However, the response does not include the corresponding object representations. Item selection code executing in conjunction with the browser requests at least one of the catalog item object representations, which tend to have a much larger data size than the identifiers. The item selection code chooses at least one of the catalog items for inclusion on the network page, based on an attribute or combination of attributes in the catalog item object representation. The attributes used by the item selection code may be those which indicate that purchase of that catalog item would result in an error. The network page is rendered for display to a user. In the following discussion, a general description of the system and its components is provided, followed by a discussion of the operation of the same.

Figure 1:
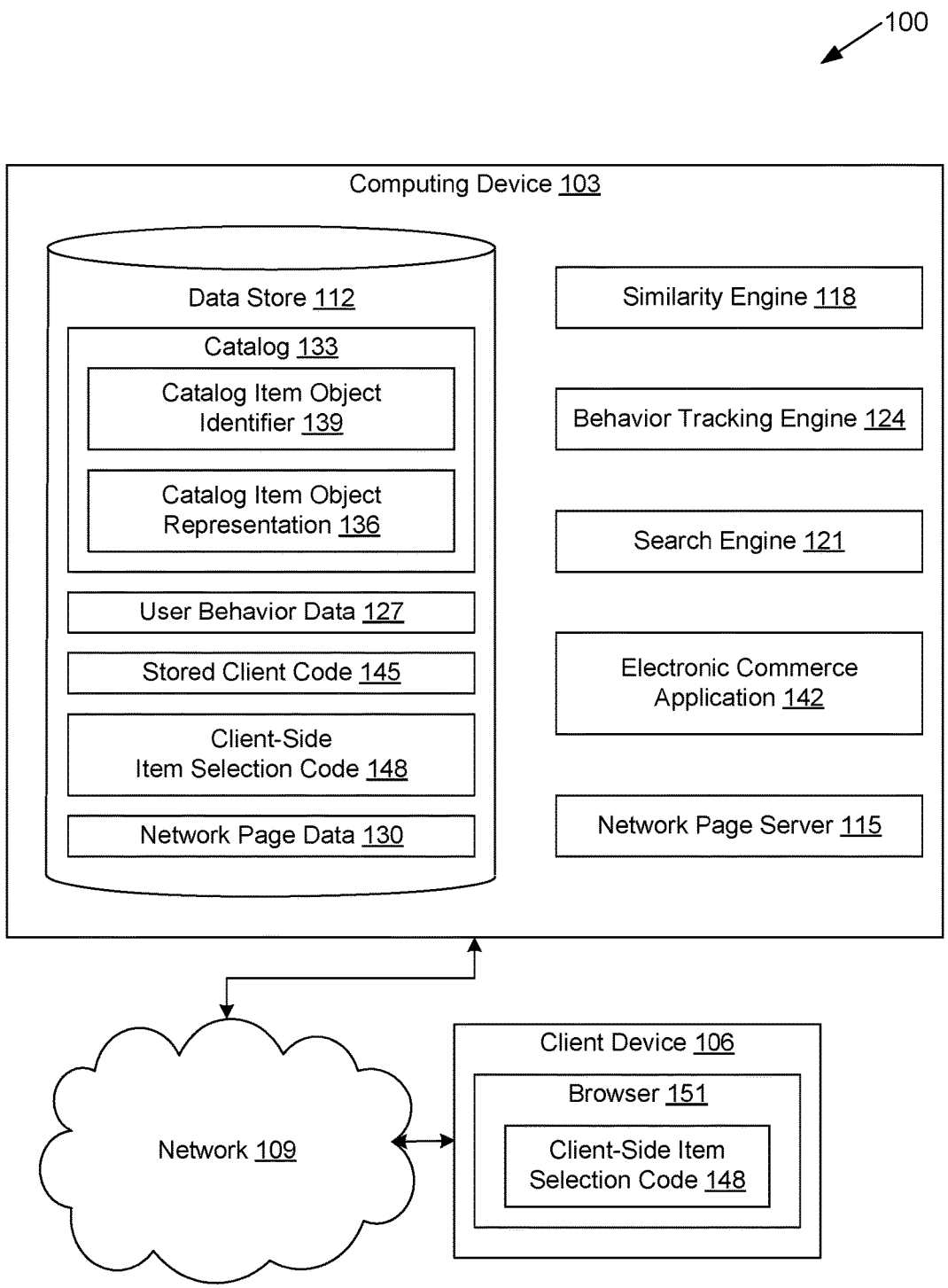
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a network page server 115 and an item similarity engine 118. In some embodiments, the computing device 103 also includes a search engine 121 and a behavior tracking engine 124. The components executed on the computing device 103 may also include other applications, services, processes, systems, engines, or functionality not discussed in detail herein. These components may communicate with each other using various mechanisms, including but not limited to any type of middleware framework. Examples of such frameworks include remote procedure calls, simple object access protocol (SOAP), representational state transfer (REST), Windows Communication Foundation, and other frameworks. Though shown as logically separate components, the functionality of these components can be combined and/or distributed in various ways, as can be appreciated.

The data stored in the data store 112 includes data accessed by the network page server 115 and the item similarity engine 118, for example, user behavior data 127, network page data 130, a catalog 133 of items, and potentially other data. As used herein, the term "item" may refer to a product, good, service, software download, multimedia download, social networking profile, or other item that may be offered for sale, purchase, rental, lease, download, and/or any other form of consumption, as may be appreciated. Item data such as titles, descriptions, keywords, metadata, weights, customer reviews, multimedia, etc., are stored by the catalog 133 as attributes packaged in a data structure referred to herein as a catalog item object representation 136. A catalog item object identifier 139 references a catalog item object representation 136, but does not include the object representation 136.

In some embodiments, the items in the catalog 133 are products offered for sale, and in such embodiments, the computing device 103 may also include an electronic commerce application 142 which is executed in order to facilitate the online viewing and/or purchase of the products from an electronic commerce operator. The electronic commerce application 142 may also perform various backend functions associated with the online presence of a merchant in order to facilitate the online purchase of items, as should be appreciated. In embodiments which include the electronic commerce application 142, the catalog 133 of items comprises a product catalog of items offered for sale, so that data associated with an item comprises product data.

The network page server 115 is executed to fetch network pages in response to requests from a client device 106. In some embodiments, the network page server 115 is a web server which is executed to fetch web pages. The network page server may comprise a commercially available hypertext transfer protocol (HTTP) server such as, for example, Apache® HTTP Server, Apache® Tomcat, Microsoft® Internet Information Services (IIS), and other servers.

The network pages fetched by the network page server 115 include various items from the catalog 133, and may be dynamically generated or may be static. To this end, the network page server 115 uses network page data 130, which may include any type of data related to the generation of network pages. Such data may include, for example, templates, executable code, interpreted code, hypertext markup language (HTML), extensible markup language (XML), images, video, text, graphics, and any other type of data that may be used in network pages. The network page server 115 may be further configured to generate, based on stored client code 145 in the data store 112, client-side item selection code 148 for inclusion within a specific network page and transmission to a client device 106. As will be further explained below, the client-side item selection code 148 is executed to offload, to the client device 106, selection of catalog items for inclusion on a network page, based on criteria such as item availability. The client-side item selection code 148 and the stored client code 145 may include, for example, JavaScript, dynamic HTML (DHTML), Ajax, and any other type of code that may be executed in a client device 106 from within a network page. The client-side item selection code 148 and the stored client code 145 may also include code that facilitates asynchronous exchange of data with the network page server 115, the search engine 121, or other applications using Ajax, simple object access protocol (SOAP), remote procedure call (RPC), and/or other technologies.

The behavior tracking engine 124 is executed to track user interaction with these network pages, thus building a history of catalog items which a particular user has viewed, selected for purchase, and/or purchased. The data derived by the behavior tracking engine 124 from this user interaction is stored as user behavior data 127. The user behavior data may also include data gathered from user interaction with a shopping cart when purchasing items, and item recommendation data relating to recommendations that are generated based on user behavior, as well as any other data which is derived from tracking user interaction with the network pages generated by the network page server 115.

The item similarity engine 118 is executed to return one or more items that are similar to an input item. The item similarity engine 118 uses the user behavior data 127 to determine similarity. For example, item B may be deemed to be similar to item A, under the following conditions: users who buy item A also buy item B; users who view item A also view item B; users who view item A also buy item B. Similarity may also be determined based at least in part on relationships between items in the catalog 133, such as whether items are members of a set or collection (e.g., a series of books or videos), or whether one item is marked as a variation of another item (e.g., a media title on DVD and the same title on Blu-Ray®).

The search engine 121, if present, is executed to find items in the catalog 133 using a search query. To provide content in response to user queries, content associated with item(s) retrieved by a query may be retrieved from the catalog 133 and included in a network page that is provided to a client device 106.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications such as a browser 151 and other applications. The client device 106 may be configured to execute applications beyond the browser 151 such as, for example, email applications, instant message applications, and/or other applications. The client-side item selection code 148 may execute in conjunction with browser 151 to process data on a network page provided by the network page server 115. As described in further detail below, the client-side item selection code 148 operates to select catalog items for inclusion on a network page based on attributes in catalog item object representations 136 that are requested from the network page server 115.

Next, a general description of the operation of the various components of the networked environment 100 is provided. To begin, a user interacts with the browser 151 executing on a client device 106. The user interaction results in the browser 151 requesting a network page from the network page server 115. As one example, when a user viewing a list of items selects a particular item, the browser 151 requests a item detail page from the network page server 115. As another example, when a user selects a checkout link, the browser requests a shopping cart page from the network page server 115. As yet another example, when a user enters search terms into a search query form, the browser 151 requests a search results page from the network page server 115. As still another example, when a user navigates within the catalog taxonomy, the browser 151 requests a category or subcategory page from the network page server 115.

In response to the page request from the browser 151, the network page server 115 returns a partially built network page along with client-side item selection code 148. The client-side item selection code 148 executes in conjunction with the browser 151 to complete the partially built network page provided by the network page server 115. The network page references multiple items by including catalog item object identifiers 139 but does not include catalog item object representations 136.

The catalog item object representations 136 are obtained in a separate request, by the client-side item selection code 148 sending one or more of the object identifiers 139 to the network page server 115 with a request for the corresponding catalog item object representation 136. For example, a search results page contains object identifiers 139 for items which match the search terms provided by the user, and a subcategory page contains object identifiers 139 for items in the requested subcategory. As another example, an item detail page includes the object identifier 139 for the requested item and also object identifiers 139 for items which are related in some way to the requested item, such as those belonging to the same category or subcategory or exhibiting similar viewing and/or purchasing behavior.

Having obtained the catalog item object representation 136, the client-side item selection code 148 continues building the network page by selecting one or more items for inclusion and/or exclusion on the page, based at least in part on various item attributes within the object representation 136. In some embodiments, the attributes used to select items are configurable by a merchant. In some embodiments, the client-side item selection code 148 includes items except those items which result in an error if purchased, for example, items that are not in stock, items that are available only for in-store rather than online purchase, or other items. In some embodiments, the client-side item selection code 148 includes items except those items which are a variation of another item on the page, which are part of a collection having another item on the page, or are a duplicate of another item on the page. The client-side item selection code 148 continues processing catalog item object representations 136 until at least the visible portion of the network page is filled. In this manner, the user experience is enhanced because the user viewing the network page is presented only with catalog items that can be purchased without error.

Figure 2:
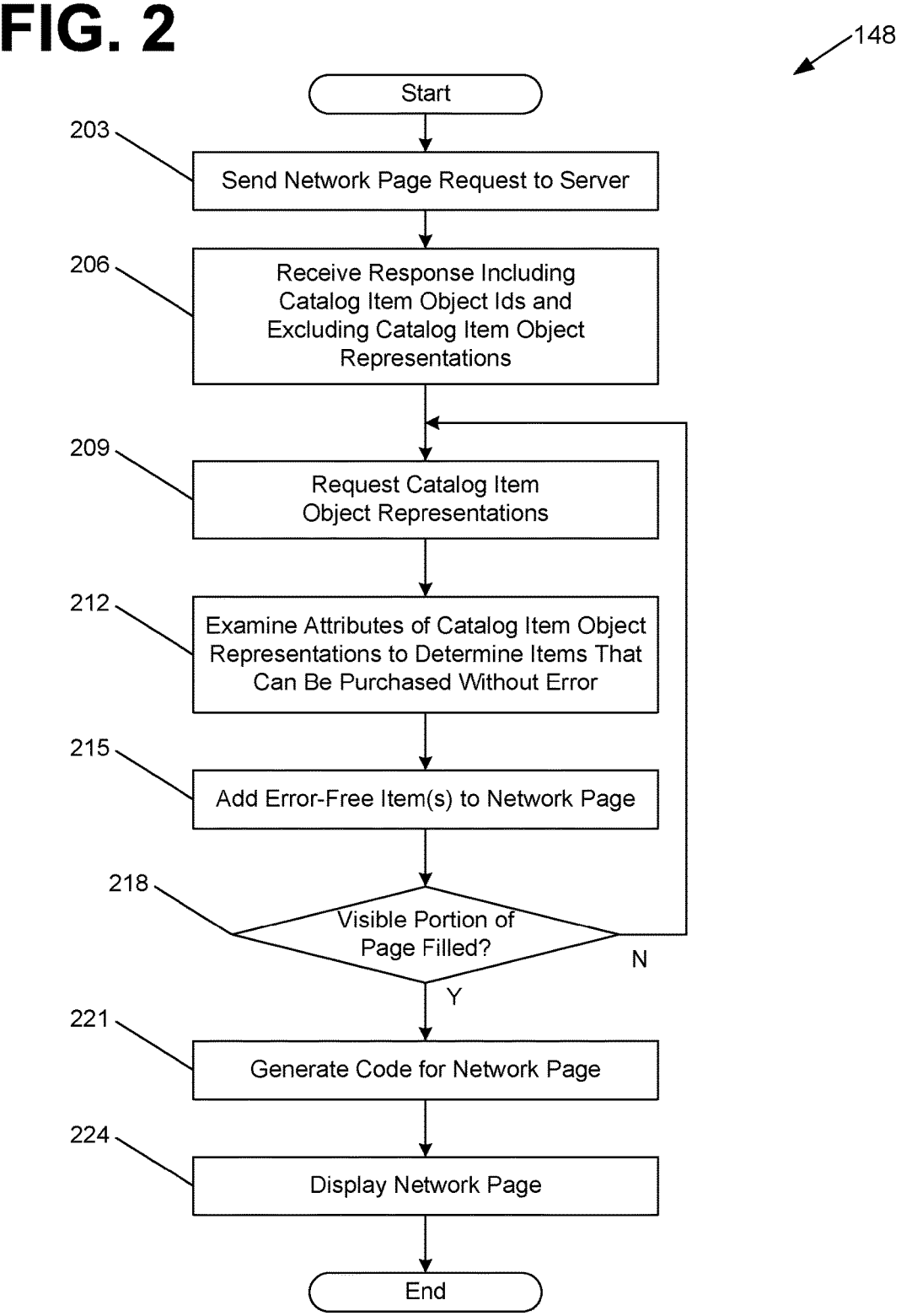
FIG. 2 is a flowchart illustrating an example of functionality implemented as portions of a network page generation application executed in a computing device in the networked environment of FIG. 1 according to various embodiments of the present disclosure.

Turning now to FIG. 2, shown is a flowchart that provides one example of the operation of a portion of the client-side item selection code 148 (FIG. 1) executed in a browser 151 (FIG. 1) according to various embodiments. It is understood that the flowchart of FIG. 2 provides merely an example of the many different types of functional arrangements that may be employed to implement the operation of the portion of the client-side item selection code 148 as described herein. As an alternative, the flowchart of FIG. 2 may be viewed as depicting an example of steps of a method implemented in the client device 106 (FIG. 1) according to one or more embodiments.

Beginning at box 203, the browser 151 executing on the client device 106 sends a network page request to a network page server 115 (FIG. 1). At box 206, the browser 151 receives a response to the network page request. The response includes multiple catalog item object identifiers 139 (FIG. 1) but does not include catalog item object representations 136 (FIG. 1). Next, at box 209, the client-side item selection code 148 included within the received network page browser 151 sends to the network page server 115 a request for catalog item object representations 136. The client-side item selection code 148 may obtain representations for specific catalog items by including corresponding object identifiers 139 in the request.

At box 212, the client-side item selection code 148 examines one or more attributes in the obtained catalog item object representations 136. The client-side item selection code 148 uses these attributes to determine which catalog items can be purchased without error. In one embodiment, items purchasable without error include items with an attribute indicating in stock but exclude items with an attribute indicating in-store purchase only. Such attributes may be encoded in various ways, as can be appreciated. For example, an out-of-stock attribute may be used instead of an in-stock attribute, or an online purchase attribute may be used rather than an in-store purchase attribute. As described above, a purchase error can also include an item that is a duplicate of another item on the page, an item that is part of a collection, and an item that is a variation of another item on the page.

Next, at box 215, the client-side item selection code 148 adds to the network page one of more of those items which can be purchased without error. At box 218, the client-side item selection code 148 determines whether the visible portion of the network page has been filled with items. If the page is not yet filled, the process moves to box 209, where additional catalog item object representations 136 are obtained from the network page server 115. When it is determined at box 218 that at least the visible portion of the page is filled with items, code for the network page (e.g., HTML, JavaScript, etc.) is generated at box 221. In some embodiments, the code is generated by the client-side item selection code 148. In other embodiments, the client-side item selection code 148 provides the network page server 115 with a list of the items selected for inclusion on the page, and the network page server 115 generates the code and sends it back to the browser 151. At box 224, the browser 151 renders the generated network page for display in the client device 106, and the process of FIG. 2 is complete.

Figure 3:
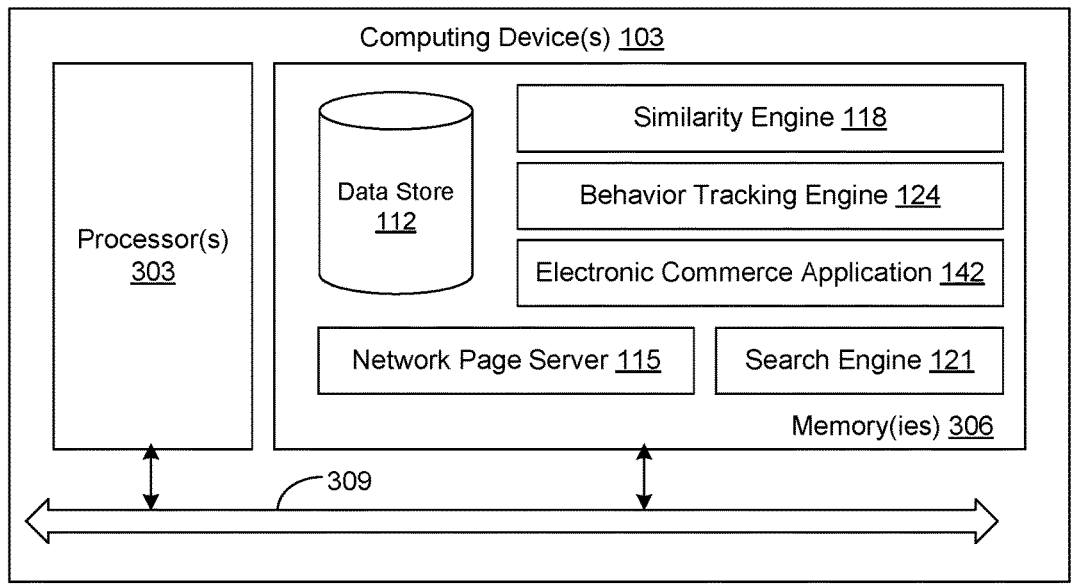
FIG. 3 is a schematic block diagram that provides one example illustration of a computing device employed in the networked environment of FIG. 1 according to various embodiments of the present disclosure.

Moving on to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the network page server 115, the item similarity engine 118, the search engine 121, the electronic commerce application 142, and potentially other applications. Also stored in the memory 306 may be a data store 112 and other data. In addition, an operating system may be stored in the memory 306 and executable by the processor 303.

Figure 4:
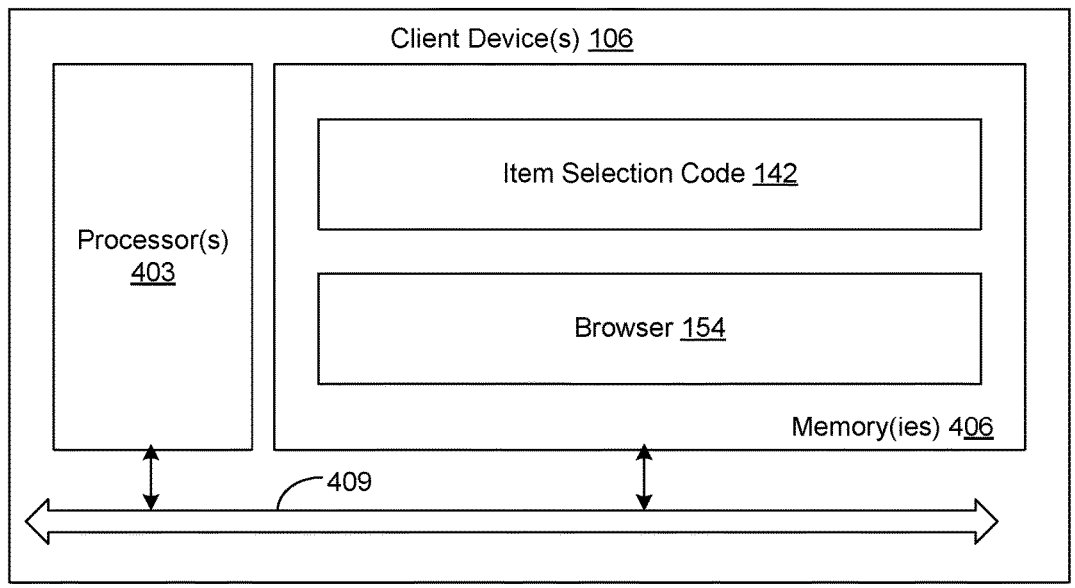
FIG. 4 is a schematic block diagram that provides one example illustration of a client device employed in the networked environment of FIG. 1 according to various embodiments of the present disclosure.

Turning now to FIG. 4, shown is a schematic block diagram of the client device 106 according to an embodiment of the present disclosure. The client device 106 includes at least one processor circuit, for example, having a processor 403 and a memory 406, both of which are coupled to a local interface 409. To this end, the client device 106 may comprise, for example, at least one client computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the browser 151, the client-side item selection code 148, and potentially other applications. In addition, an operating system may be stored in the memory 406 and executable by the processor 403.

It is understood that there may be other applications that are stored in the memories 306, 406 and are executable by the processors 303, 403, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 306, 406 and are executable by the processors 303, 403. In this respect, the term "executable" means a program file that is in a form that can ultimately be run by the processors 303, 403. Examples of executable programs may be, for example, a compiled program that can be translated into machine code in a format that can be loaded into a random access portion of the memories 306, 406 and run by the processors 303, 403, source code that may be expressed in proper format such as object code that is capable of being loaded into a random access portion of the memories 306, 406 and executed by the processors 303, 403, or source code that may be interpreted by another executable program to generate instructions in a random access portion of the memories 306, 406 to be executed by the processors 303, 403, etc. An executable program may be stored in any portion or component of the memories 306, 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 306, 406 are defined herein as including both volatile and nonvolatile memory and data storage components. Volatile components are those that do not retain data values upon loss of power. Nonvolatile components are those that retain data upon a loss of power. Thus, the memories 306, 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 303, 403 may represent multiple processors and the memories 306, 406 may represent multiple memories that operate in parallel processing circuits, respectively. In such a case, the local interface 309, 409 may be an appropriate network 109 (FIG. 1) that facilitates communication between any two of the multiple processors 303, 403, between any processors 303, 403 and any of the memories 306, 406, or between any two of the memories 306, 406, etc. The local interface 309, 409 may comprise additional systems designed to coordinate this communication, including, for example, performing load balancing. The processors 303, 403 may be of electrical or of some other available construction.

Although the network page server 115, the item similarity engine 118, the search engine 121, the electronic commerce application 142, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the client-side item selection code 148 and the browser 151. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 303, 403 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in flowchart of FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 115, the item similarity engine 118, the search engine 121, the electronic commerce application 142, the browser 151, and client-side item selection code 148, that comprises software or code can be embodied in any non-transitory computer-readable medium for use by or in connection with an instruction execution system such as, for example, processors 303, 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:
    receive a network page request for a network page of an electronic marketplace;
    send a response including client-side item selection code and a plurality of product object identifiers but excluding a plurality of product object representations, wherein the client-side item selection code is based at least in part on client-side code stored in a data store;
    receive a request for at least one of the plurality of product object representations corresponding to at least one of the plurality of product object identifiers, the at least one of the plurality of product object representations selected based at least in part on the client-side item selection code and a plurality of attributes corresponding to the plurality of product object identifiers, a subset of the plurality of attributes indicating at least one of: a product is not part of a collection or the product is not a variation of another product; and
    send the at least one of the plurality of product object representations selected.

2. The non-transitory computer-readable medium of claim 1, wherein the plurality of product object identifiers and the plurality of product object representations correspond to a plurality of products.

3. The non-transitory computer-readable medium of claim 1, wherein the client-side item selection code is generated based at least in part on client-side code stored in a memory associated with the at least one computing device.

4. The non-transitory computer-readable medium of claim 1, wherein a data size for each of the plurality of product object identifiers is less than a corresponding data size for each of the plurality of product object representations.

5. The non-transitory computer-readable medium of claim 1, wherein the at least one of the product object representations is selected based at least in part on a combination of the plurality of attributes.

6. The non-transitory computer-readable medium of claim 1, wherein the program further causes the at least one computing device to at least:
    receive a second request for another at least one of the plurality of product object representations corresponding to another at least one of the plurality of product object identifiers; and
    send the other at least one of the plurality of product object representations.

7. The non-transitory computer-readable medium of claim 1, wherein the at least one of the plurality of product object representations selected is sent asynchronously.

8. A method comprising:
    sending, by at least one computing device, a plurality of catalog item object identifiers but excluding a plurality of catalog item object representations, the plurality of catalog item object identifiers corresponding to the plurality of catalog item object representations and to a plurality of catalog items;
    receiving, by the at least one computing device, a request indicating a selection of at least one of the plurality of catalog item object representations for inclusion in a network page generated by client-side network page code, the selection being based at least in part on a plurality of attributes corresponding to the plurality of catalog item object identifiers, wherein a subset of the plurality of attributes indicate at least one of: a corresponding one of the catalog items is not part of a collection or the corresponding one of the catalog items is not a variation of another catalog item; and
    sending, by the at least one computing device, the at least one of the plurality of catalog item object representations to be rendered in the network page for display to a user.

9. The method of claim 8, further comprising:
    receiving, by the at least one computing device, a network page request for the network page from a client device; and
    sending, by the at least one computing device, the client-side network page code to the client device in response to receiving the network page request.

10. The method of claim 9, wherein the client-side network page code is configured to make the selection of the at least one of the plurality of catalog item object representations when executed by the client device.

11. The method of claim 8, wherein the network page is at least one of: a shopping cart network page or a catalog item detail page.

12. The method of claim 8, further comprising:
    receiving, by the at least one computing device, a second request for another at least one of the plurality of catalog item object representations for inclusion in the network page generated by the client-side network page code; and
    sending, by the at least one computing device, the other at least one of the plurality of catalog item object representations to be rendered in the network page for display to the user.

13. A system comprising:
a data store comprising client-side code; and
at least one computing device communicably coupled to the data store, the at least one computing device being configured to at least:
send, in response to a first network request from a client device, a response including client-side item selection code and a plurality of catalog item object identifiers but excluding a plurality of catalog item object representations, the client-side item selection code being based at least in part on the client-side code;
receive a second network request from the client-side item selection code requesting a subset of the plurality of catalog item object representations, the client-side item selection code being executed by the client device and the subset of the plurality of catalog item object representations being selected based at least in part on a subset of a plurality of attributes that indicate at least one of: a corresponding one of the catalog items is not part of a collection or the corresponding one of the catalog items is not a variation of another catalog item; and
send, in response to the second network request, the subset of the plurality of the catalog item object representations to the client device.

14. The system of claim 13, wherein individual ones of the plurality of catalog item object representations that belong to the subset of the plurality of catalog item object representations are selected by the client-side item selection code.

15. The system of claim 13, wherein the first network request corresponds to a particular catalog item of a plurality of catalog items and the plurality of catalog item object identifiers comprises a subset of a population of catalog item object identifiers, the population of catalog item object identifiers individually corresponding to the plurality of catalog items.

16. The system of claim 15, wherein the at least one computing device is configured to at least select the subset of the population of catalog item object identifiers based at least in part on the first network request.

17. The system of claim 13, wherein individual ones of the plurality of catalog item object representations comprise the plurality of attributes packaged in a data structure.

18. The system of claim 17, wherein the plurality of attributes comprise at least one of: a title, a description, a keyword, metadata, a weight, a customer review, or a multimedia file.

19. The system of claim 17, wherein individual ones of the plurality of catalog item object representations includes a title, a description, a keyword, metadata, a weight, a customer review, and a multimedia file.

20. The system of claim 13, wherein individual ones of the plurality of catalog item object identifiers comprise the plurality of attributes packaged in a data structure.

* * * * *